(12) United States Patent
Tanaka et al.

(10) Patent No.: US 7,581,473 B2
(45) Date of Patent: Sep. 1, 2009

(54) TOOL HOLDER AND MACHINE TOOL EQUIPPED WITH THE TOOL HOLDER

(75) Inventors: Naoya Tanaka, Aichi pref. (JP); Yoshiya Katsu, Aichi pref. (JP); Takamori Izaki, Aichi pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 0 days.

(21) Appl. No.: 12/115,593

(22) Filed: May 6, 2008

(65) Prior Publication Data

US 2008/0284117 A1     Nov. 20, 2008

(30) Foreign Application Priority Data

May 17, 2007 (JP) .............................. 2007-131337

(51) Int. Cl.
  *B23B 19/00* (2006.01)
  *B23B 23/00* (2006.01)
(52) U.S. Cl. ..................... 82/155; 82/160; 279/2.02
(58) Field of Classification Search .................. 82/155, 82/161, 160, 159, 121; 29/35.5; 279/2.02, 279/2.03, 2.04, 155, 156
See application file for complete search history.

(56) References Cited

U.S. PATENT DOCUMENTS

| 2,645,952 | A | * | 7/1953 | Bunnell | 74/22 R |
| 2,833,546 | A | * | 5/1958 | Johnson | 279/51 |
| 2,869,402 | A | * | 1/1959 | Bunnell | 74/22 R |
| 3,115,798 | A | * | 12/1963 | Donaway | 82/155 |
| 3,719,254 | A | * | 3/1973 | Snider | 184/64 |
| 4,620,824 | A | * | 11/1986 | Eckstein et al. | 409/233 |
| 5,054,176 | A | * | 10/1991 | Wachter | 29/40 |
| 6,487,945 | B1 | * | 12/2002 | Leiber | 82/1.4 |

(Continued)

FOREIGN PATENT DOCUMENTS

DE     101 47 649     4/2003

(Continued)

OTHER PUBLICATIONS

Japanese Office Action for corresponding application No. JP 2007-131337 dated Apr. 14, 2009.

(Continued)

*Primary Examiner*—Willmon Fridie
(74) *Attorney, Agent, or Firm*—Renner, Otto, Boisselle & Sklar, LLP.

(57) ABSTRACT

The present invention provides a tool holder interchangeably attached to a machine tool such as a combined machining lathe. A combined machining lathe 1 comprises main spindles 20 and 30 for gripping a workpiece, and a machining main spindle head 50 which rotates around a B axis. There are provided stockers $S_1$ and $S_2$ inside the lathe, and tool holders 200 and 300 are respectively stored in the stockers $S_1$ and $S_2$. The tool holder 200 comprises a taper shank portion 230 of a main shaft in a housing 210 and four pull studs $PS_2$ around the taper shank portion 230 of a main shaft, and is gripped by collet chucks of the machining main spindle head 50. Rotation of the taper shank portion 230 of a main shaft is transmitted to a shaft 250 via a gear mechanism, to drive a drill tool 252 to drill a deep hole.

2 Claims, 5 Drawing Sheets

U.S. PATENT DOCUMENTS

2003/0111786 A1    6/2003    Fries

FOREIGN PATENT DOCUMENTS

| EP | 1 321 221 | 6/2003 |
| FR | 2 687 338 | 8/1993 |
| JP | 58-094946 | 6/1983 |
| JP | 61-033832 | 2/1986 |
| JP | 62-114844 | 5/1987 |
| JP | 63-221941 | 9/1988 |
| JP | 10-286735 | 10/1998 |
| JP | 2003-080408 | 3/2003 |

OTHER PUBLICATIONS

Japanese Office Action for corresponding application No. 2007-131337 dated Dec. 16, 2008.

Extended European Search Report dated Aug. 7, 2008 for corresponding European Application No. 08405124.2.

* cited by examiner

TOOL HOLDER AND MACHINE TOOL EQUIPPED WITH THE TOOL HOLDER

The present application is based on and claims priority of Japanese patent application No. 2007-131337 filed on May 17, 2007, the entire contents of which are hereby incorporated by reference.

BACKGROUND OF THE INVENTION

1. Field of the Invention

The present invention relates to a tool holder equipped with a long turning tool or a special rotating tool, and a machine tool such as a combined machining lathe equipped with the tool holder.

2. Description of the Related Art

For example, Japanese Patent Laid-Open Publication No. 2003-80408 (Patent Document 1) discloses an apparatus equipped with a boring bar for boring deep holes or the like.

The apparatus disclosed in the Patent Document comprises:

(1) a long boring bar having a function (ATC) of automatically changing tip tools and comprising a tool supporting device; and (2) a tool rest comprising a long boring bar supporting device including a long boring bar attaching portion to and from which the long boring bar can be attached and detached in a direction of a main spindle axis.

However, for example, milling in a deep hole has not been achieved by the related arts.

An object of the present invention is to provide a tool holder attached to a machining main spindle head of a machine tool and comprising a mechanism for reducing the effect of cutting resistance on a machining main spindle of the machine tool, and a machine tool equipped with the tool holder.

SUMMARY OF THE INVENTION

In order to achieve the above object, a tool holder interchangeably attached to a machining main spindle head of a machine tool according to the present invention comprises: a housing; a driving main shaft including a taper shank portion disposed in a center of the housing; a driving shaft disposed parallel to the driving main shaft and supported by a bearing; a gear mechanism for transmitting rotation between the driving main shaft and the driving shaft; a tool disposed at an end of the driving shaft; and four pull studs disposed around an outer circumference of the housing. The four pull studs are gripped by four collet chucks disposed in the machining main spindle head of the machine tool to rigidly hold the housing in the machining main spindle head. The driving main shaft is inserted into a machining main spindle of the machine tool so as to be supported by a bearing of the machining main spindle.

A machining main spindle head of a machine tool according to the present invention comprises a machining main spindle including a taper shank hole, and four collet chucks disposed around the machining main spindle, the four collet chucks holding the tool holder by gripping four pull studs disposed in the tool holder.

The number of pull studs and collet chucks may be changed as needed.

According to the present invention, with the features as described above, when the tool holder is attached to the machining main spindle of the machine tool to perform heavy cutting such as deep-hole machining, the cutting resistance is received by the driving shaft of the tool holder. Therefore, it is possible to prevent the machining main spindle of the machine tool from being heavily stressed, so as to improve durability or the like.

DETAILED DESCRIPTION OF THE PREFERRED EMBODIMENTS

Figure 1:
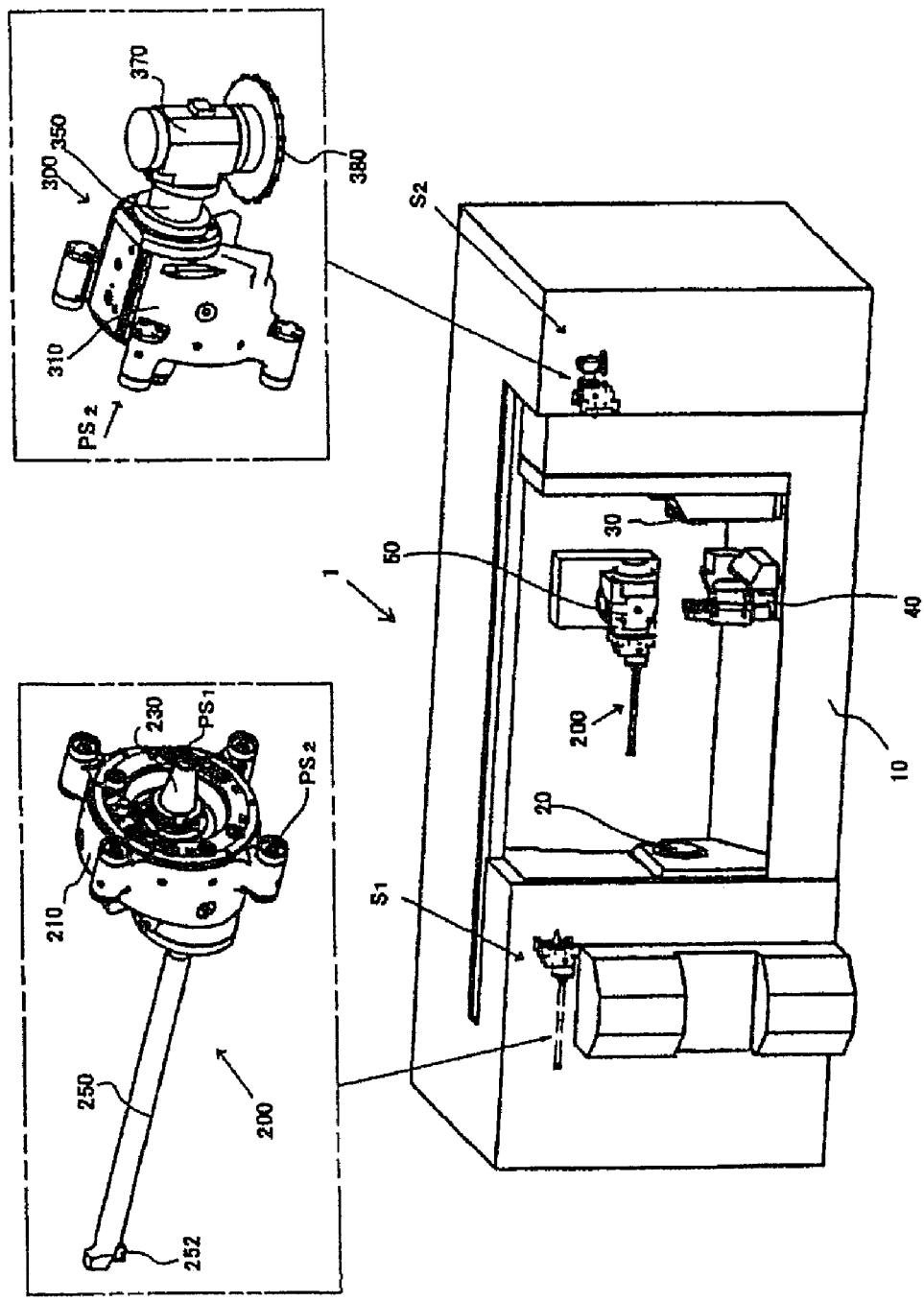
FIG. 1 is an explanatory diagram schematically showing a combined machining lathe as one example of a machine tool equipped with a tool holder according to the present invention.

FIG. 1 is an explanatory diagram schematically showing a combined machining lathe as one example of a machine tool equipped with a tool holder according to the present invention.

The combined machining lathe generally denoted by a reference numeral 1 comprises a first main spindle 20 disposed on a bed 10 for gripping a workpiece, and a second main spindle 30 disposed facing the first main spindle 20.

A steady rest 40 and a machining main spindle head 50 are disposed between the first main spindle 20 and the second main spindle 30.

The machining main spindle head 50 performs required machining by selectively attaching a turning tool and a rotating tool provided from an ATC device not shown. The machining main spindle head 50 ban rotate its spindle from a position facing the first main spindle 20 over a position facing the second main spindle 30.

The combined machining lathe 1 further comprises a stocker $S_1$ which stores a tool holder 200 in the first main spindle 20 side, and a stocker $S_2$ which stores a tool holder 300 in the second main spindle 30 side inside the lathe.

Figure 2:
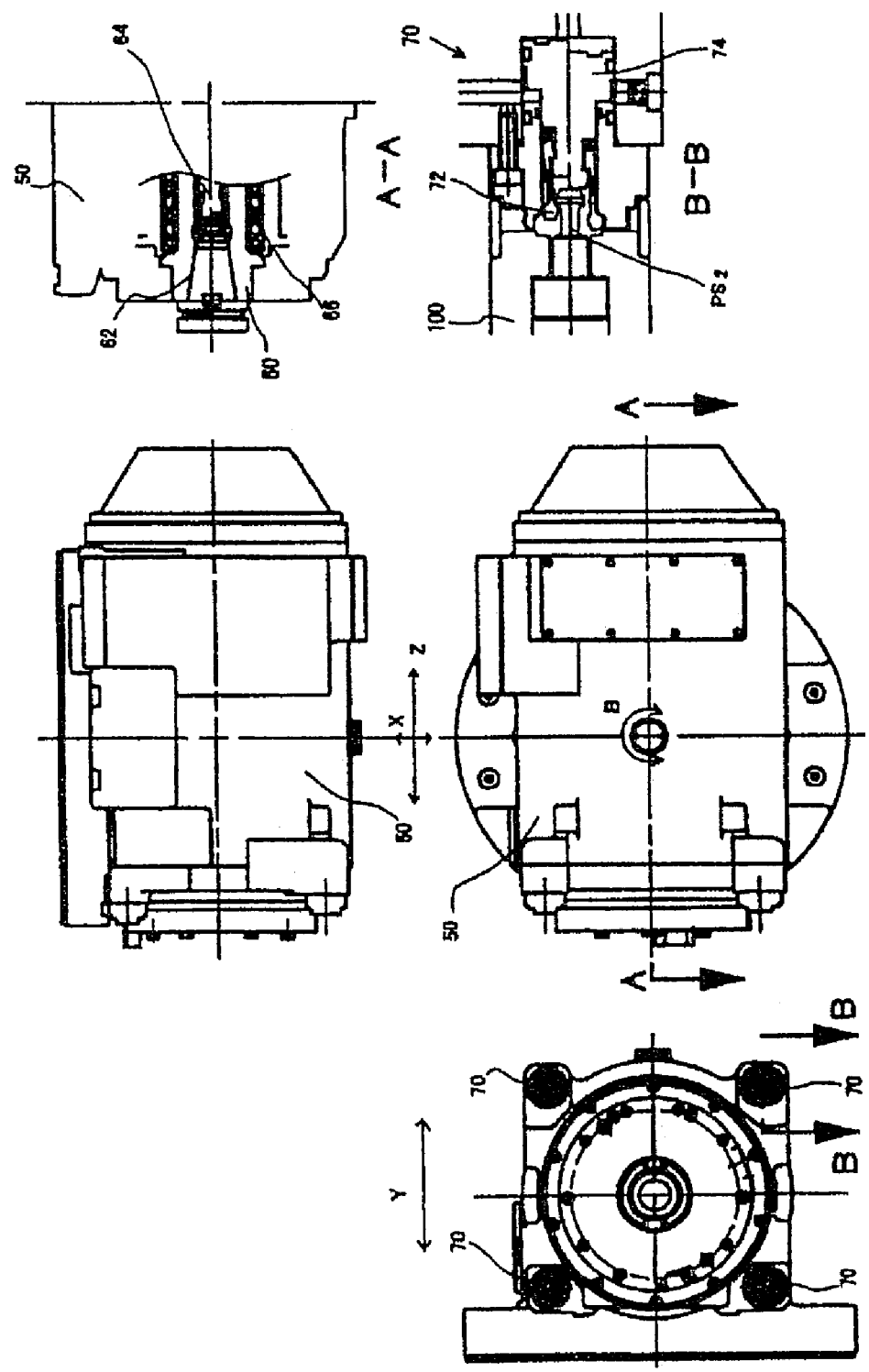
FIG. 2 is an explanatory diagram schematically showing a machining main spindle head.

FIG. 2 is an explanatory diagram schematically showing the machining main spindle head 50.

The machining main spindle head 50 comprises a machining main spindle 60. The machining main spindle 60 comprises a taper shank hole 62 for receiving a taper shank as an interchangeable tool, and a drawbar 64 for drawing a tool shank. The machining main spindle 60 is supported in a rapidly rotatable manner by a bearing 66 in the machining main spindle head.

Movement of the machining main spindle head 50 is controlled in the X axis, Y axis and Z axis directions, and rotation of the machining main spindle head 50 is controlled around the B axis.

The machining main spindle head 50 further comprises four collet chuck units 70, which are clamping devices, disposed around the machining main spindle 60. Each of the collet chuck units 70 comprises a piston 74 which is hydraulically operated, and a collet claw 72 which is opened and closed by the piston 74, and grips each of four pull studs $PS_2$ disposed in an interchangeably attached tool holder 100.

Figure 3:
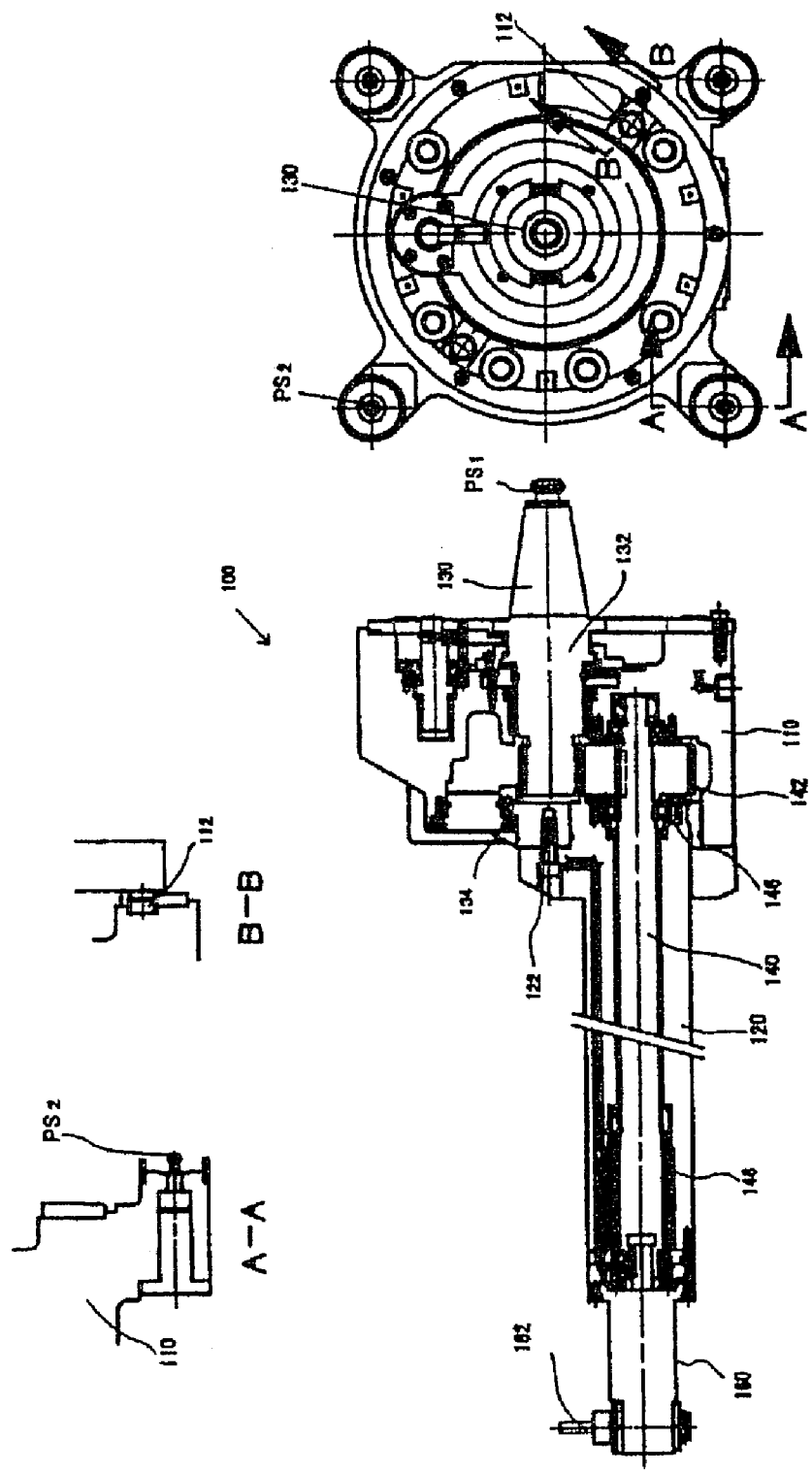
FIG. 3 is an explanatory diagram showing the structure of a tool holder according to one embodiment of the present invention.

FIG. 3 is an explanatory diagram showing the structure of a tool holder 100 according to one embodiment of the present invention.

The tool holder 100 comprises a housing 110. A driving main shaft 132 having a taper shank portion 130 is rotatably attached to the housing 110. The driving main shaft 132 comprises a pinion gear 134, which meshes with a gear 142 of a driving shaft 140. The driving main shaft 132 is provided in a so-called floating manner in which the driving main shaft 132 is not supported by a bearing or the like. The taper shank portion 130 is inserted into the machining main spindle of the machine tool, and the driving main shaft 132 is thereby driven in combination with the machining main spindle of the machine tool. The driving shaft 140 is supported by a bearing 146 in a long bar 120 which is attached to the housing 110 by a bolt 122.

The housing 110 comprises four pull studs $PS_2$ and a positioning pin 112.

The tool holder 100 comprises a coupling or a passage for coolant, and coolant may be supplied from the machine tool to the tool holder 100.

An angle tool unit 160 may be connected to the end of the long bar 120. The angle tool unit 160 has a mechanism for converting the rotation of the driving shaft 140 into rotation in an orthogonal direction to drive a rotating tool 162. It is possible to drill a hole in an inner wall of, for example, 800 mm deep hole by using the angle tool unit 160.

In the case of such machining, a large bending stress or the like is applied to the tool holder 100. However, the bending stress is received by the long bar 120 and the housing 110 to which the angle tool unit 160 is attached.

The housing 110 of the tool holder 100 is rigidly held by the machining main spindle head of the machine tool using the four pull studs $PS_2$. Therefore, a resistance force such as the bending stress is prevented from being transmitted from the driving main shaft 132 to the machining main spindle 60 of the machine tool, so as to prevent the supporting structure in the machining main spindle 60 side from being stressed.

Figure 4:
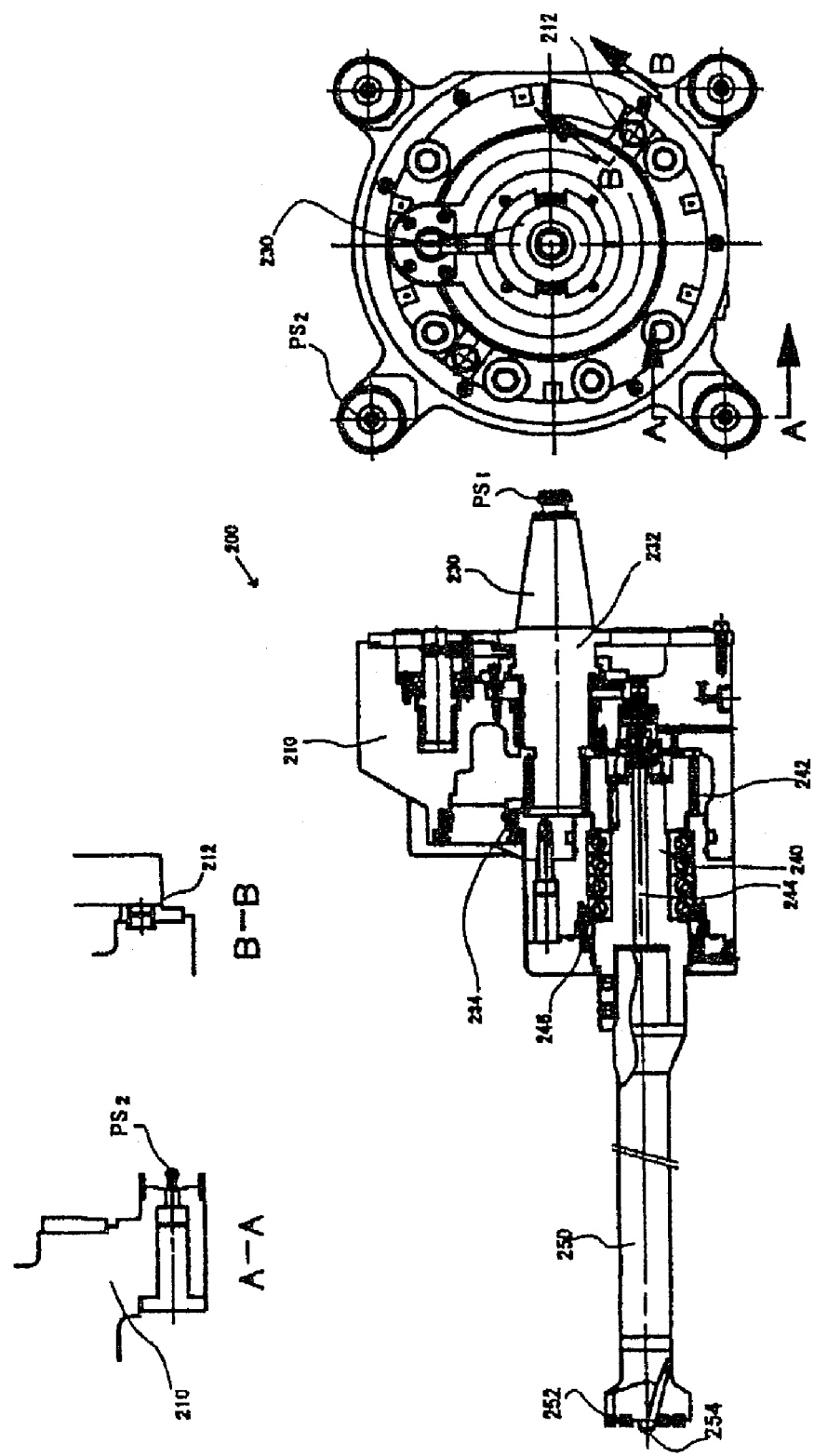
FIG. 4 is an explanatory diagram showing the structure of a tool holder according to another embodiment of the present invention.

FIG. 4 is an explanatory diagram showing the structure of the tool holder 200 as shown in FIG. 1.

The tool holder 200 comprises a housing 210, and a driving main shaft 232 including a taper shank portion 230 is rotatably attached to the housing 210. A pull stud $PS_1$ is provided at the end of the taper shank portion 230, and the driving main shaft 232 comprises a pinion gear 234. A driving shaft 240 disposed parallel to the driving main shaft 232 is rigidly supported by a bearing 246 in the housing 210. The driving shaft 240 comprises a gear 242, which meshes with the pinion gear 234 of the driving main shaft 232. A coolant passage 244 is formed in the center of the driving shaft 240.

A long drill tool 250 is inserted into a hole formed at the end of the driving shaft 240. A drill cutter 252 and a centering cutter 254 are attached to the end of the drill tool 250. Coolant is supplied to the drill cutter 252 as needed.

In drilling, a large force in a thrust direction is applied to the tool holder 200. However, the large force is received by the housing 210 via the bearing 246.

The tool holder 200 comprises four pull studs $PS_2$ in the end face of the housing 210, and is rigidly attached to the machining main spindle head. The tool holder 200 further comprises a positioning pin 212.

Figure 5:
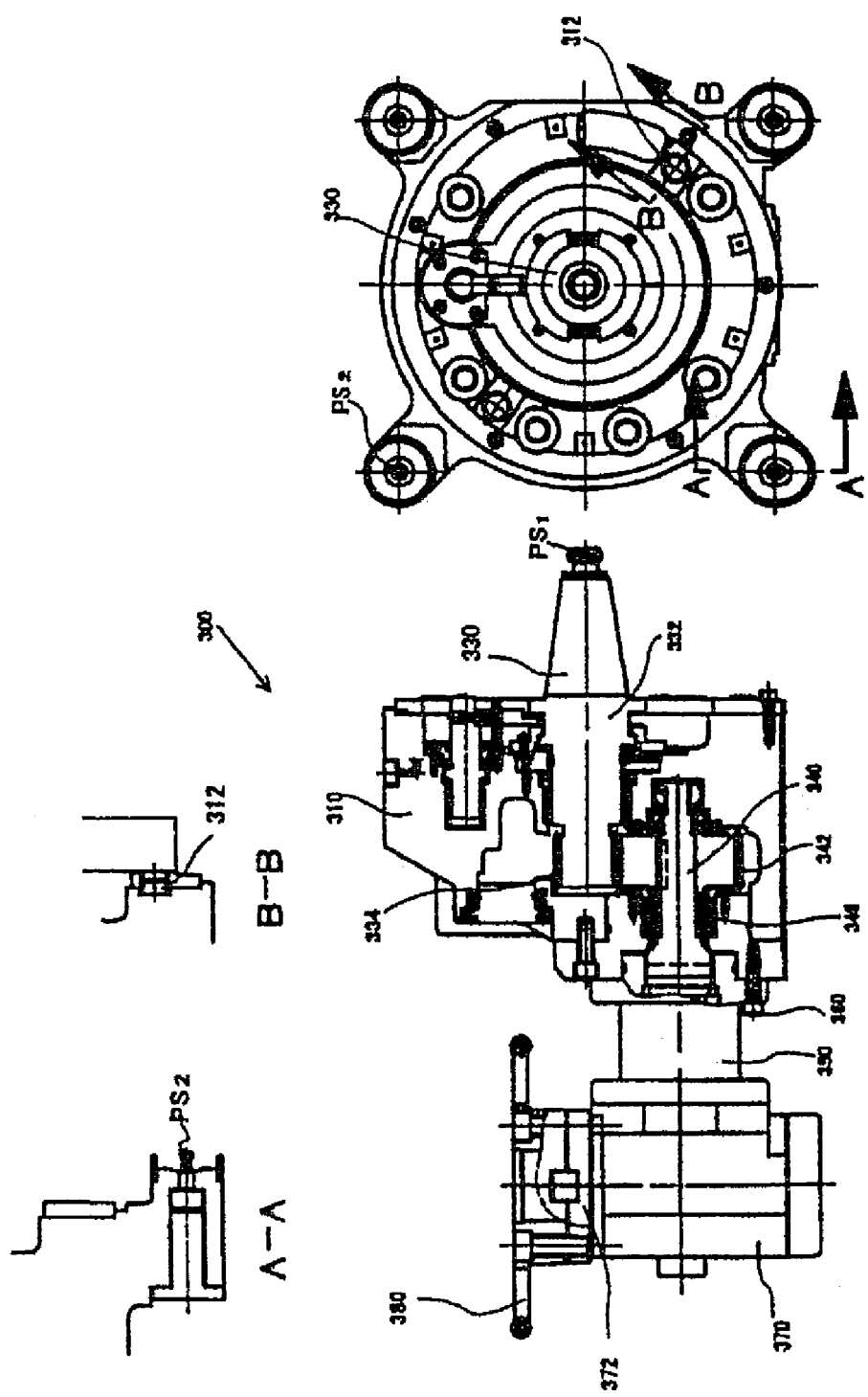
FIG. 5 is an explanatory diagram showing the structure of a tool holder according to another embodiment of the present invention.

FIG. 5 is an explanatory diagram showing the structure of a tool holder 300 according to another embodiment of the present invention.

The tool holder 300 comprises a housing 310, and a driving main shaft 332 including a taper shank portion 330 is rotatably attached to the housing 310. A pull stud $PS_1$ is provided at the end of the taper shank portion 330, and the driving main shaft 332 comprises a pinion gear 334. A driving shaft 340 disposed parallel to the driving main shaft 332 is rigidly supported by a bearing 346 in the housing 310. The driving shaft 340 comprises a gear 342, which meshes with the pinion gear 334 of the driving main shaft 332.

A housing 350 of a side cutter holder is secured to the housing 310 by a bolt 360. An input shaft connected to the driving shaft 340 is provided in the housing 350 of a side cutter holder and the input shaft power is converted into a power in an orthogonal direction by a gear mechanism in a gear box 370, and is transmitted to an output shaft 372. A side cutter 380 is attached to the output shaft 372.

The tool holder 300 also comprises four pull studs $PS_2$ in the end face of the housing 310, and is rigidly attached to the machining main spindle head. The tool holder 300 further comprises a positioning pin 312.

What is claimed is:

1. A tool holder interchangeably attached to a machining main spindle head of a machine tool, comprising:
    a housing;
    a driving main shaft including a taper shank portion disposed in a center of the housing;
    a driving shaft disposed parallel to the driving main shaft and supported by a bearing;
    a gear mechanism for transmitting rotation between the driving main shaft and the driving shaft;
    a tool disposed at an end of the driving shaft; and
    four pull studs disposed around an outer circumference of the housing, wherein
    the four pull studs are gripped by four collet chucks disposed in the machining main spindle head of the machine tool to rigidly hold the housing in the machining main spindle head, and the driving main shaft is inserted into a machining main spindle of the machine tool so as to be supported by a bearing of the machining main spindle.

2. A machine tool to which a tool holder is interchangeably attached, comprising:
    a machining main spindle head including a machining main spindle having a taper shank hole, and four collet chucks disposed around the machining main spindle, and
    the collet chucks holding the tool holder by gripping four pull studs disposed in the tool holder.

\* \* \* \* \*